Feb. 9, 1937. W. F. ST. CLAIR 2,070,242
THERMOPLASTIC PRODUCT AND METHOD OF FORMING SAME
Filed March 7, 1934 4 Sheets-Sheet 4

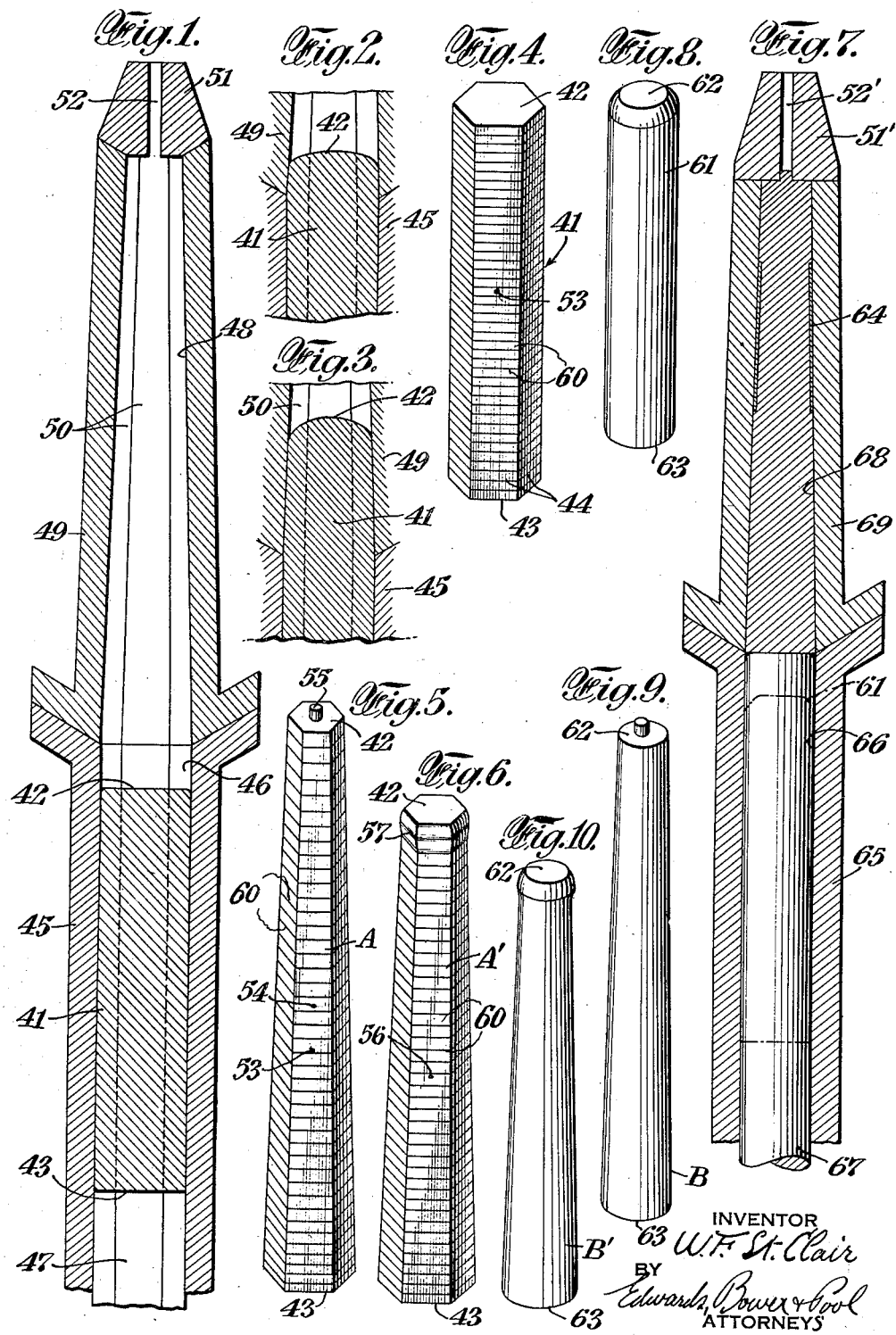

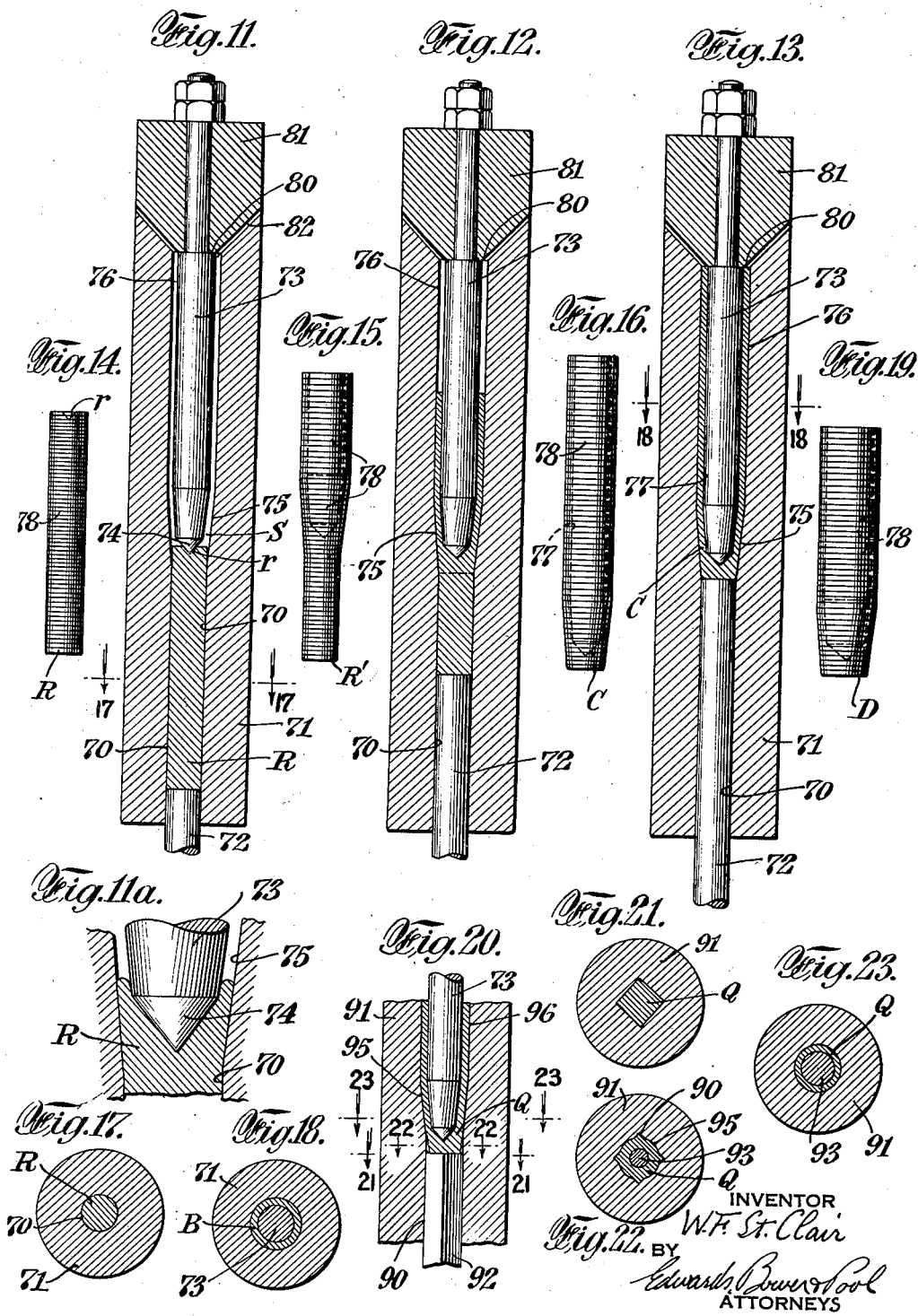

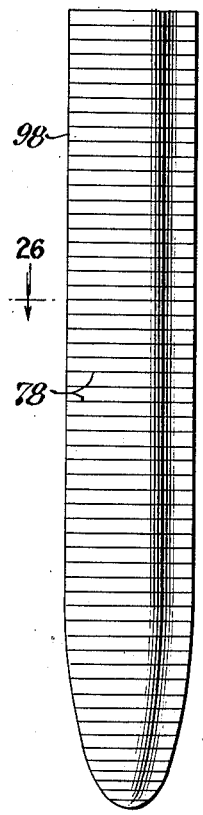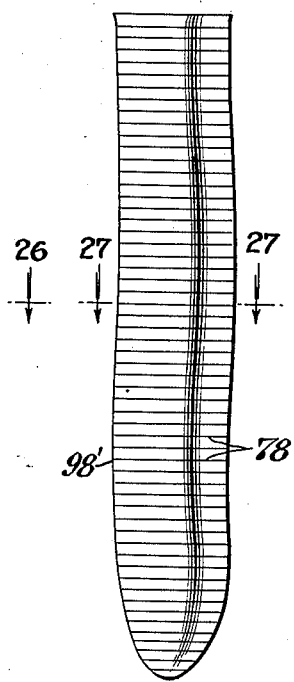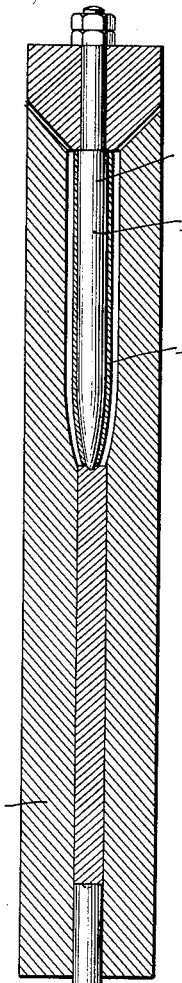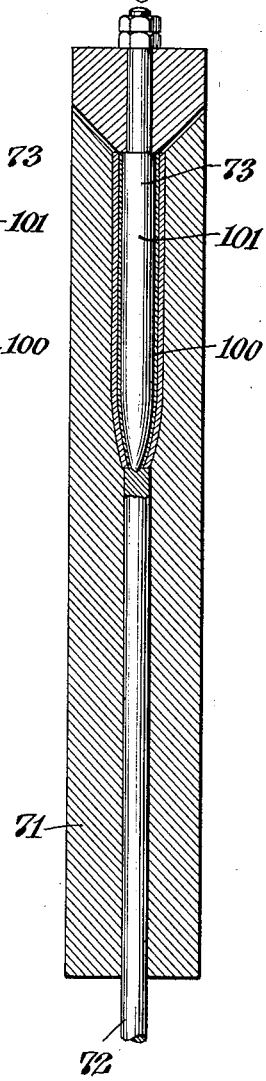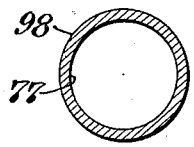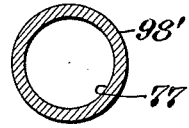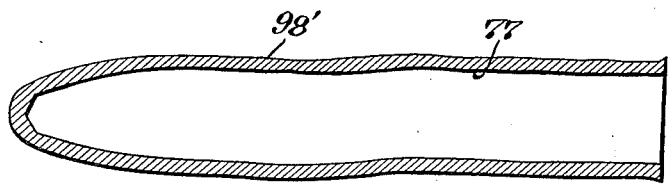

INVENTOR
Wilbur F. St. Clair
BY Edwards, Bower & Pool
ATTORNEYS

Patented Feb. 9, 1937

2,070,242

UNITED STATES PATENT OFFICE 2,070,242

THERMOPLASTIC PRODUCT AND METHOD OF FORMING SAME

Wilbur F. St. Clair, Newark, N. J., assignor to Celluloid Corporation, Newark, N. J., a corporation of New Jersey Application March 7, 1934, Serial No. 714,389

8 Claims. (Cl. 18—55)

This invention relates to molded articles of thermoplastic material and particularly to such articles formed by molding of the thermoplastic from solid stock material.

The main object of the invention is to provide such a molded article which will be simple in formation and strong in structure and tending to permanently hold its shape.

A further object of the invention is to provide a molded article having a pleasing surface decoration formed integral with the material of the tube so as to be durable and lasting in use.

Further objects of the invention particularly in the method of forming and finishing solid and tubular articles will appear from the following description taken in connection with the accompanying drawings in which Fig. 1 is a longitudinal sectional view illustrating the method of molding stock into a solid product, Figs. 2 and 3 are similar partial views illustrating successive positions of the solid stock material in the molding action, Fig. 4 is a perspective view of one form of solid stock material used in the method shown in Figs. 1, 2 and 3, Fig. 5 is a perspective view of the solid product of the method shown in Figs. 1, 2 and 3, Fig. 6 is a perspective view of the article shown in Fig. 5 after said article has been heated sufficiently to permit the initial internal stresses to partially restore the material to the form of the original blank, Fig. 7 is a view similar to Fig. 1 but illustrating a modification and showing the product in its final position in the die, Fig. 8 is a perspective view of the blank used in the method illustrated in Fig. 7, Fig. 9 is a perspective view of the product produced by the method of Fig. 7.

Figure 31:
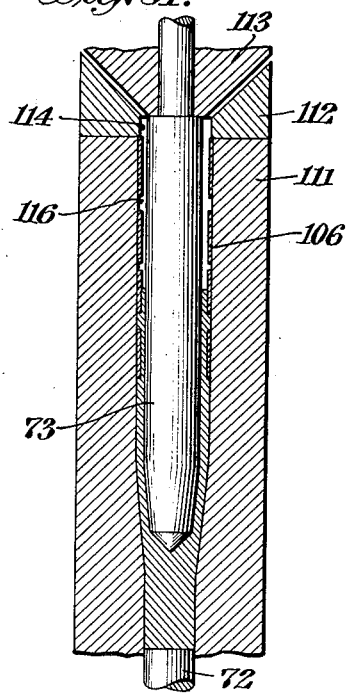
Figure 32:
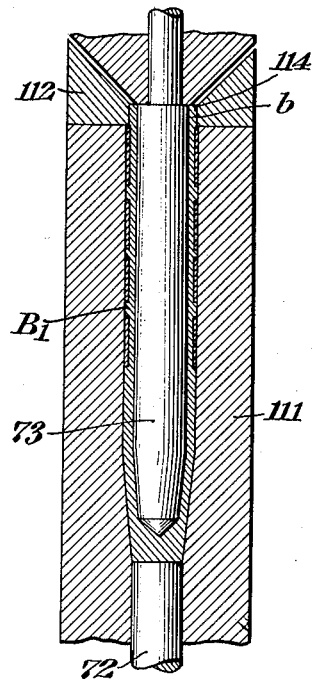
Figure 33:
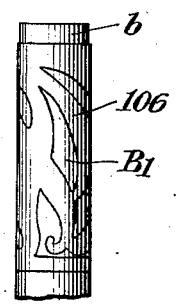
Figure 34:
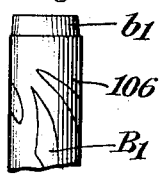
Figure 35:
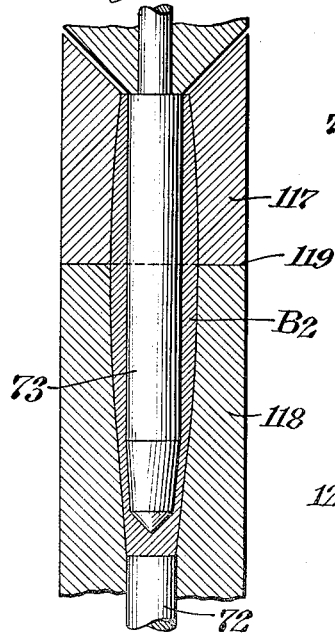
Figure 36:
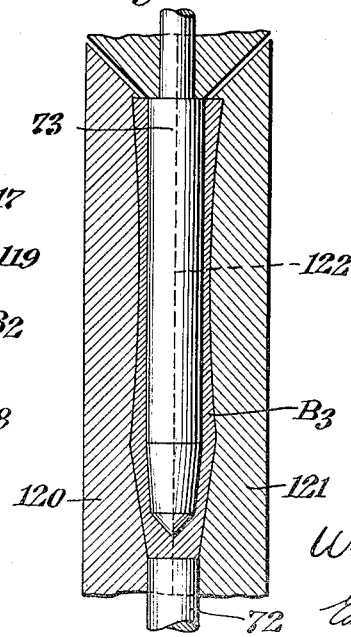
Figure 37:
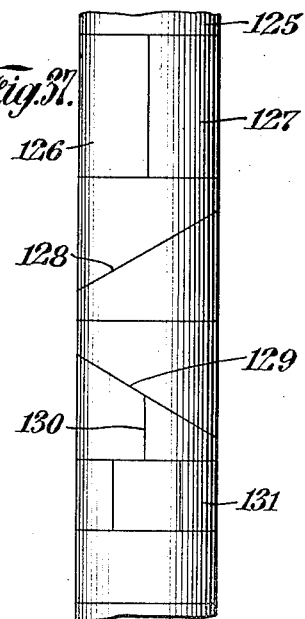

Fig. 10 is a perspective view of the article shown in Fig. 9 after said article has been heated sufficiently to permit the initial internal stresses to partially restore the material to the form of the original blank, Figs. 11, 12 and 13 are longitudinal cross sectional views of a molding apparatus illustrating the formation of a tubular product of this invention, Fig. 11a is a partial sectional view on enlarged scale illustrating an intermediate step between Figs. 11 and 12, Figs. 14, 15 and 16 are elevational views illustrating in succession the blank and its formation into a tubular product, Fig. 17 is a cross sectional view taken on lines 17—17 of Fig. 11 and looking in the direction of the arrows, Fig. 18 is a cross sectional view taken on the line 18—18 of Fig. 13 and looking in the direction of the arrows, Fig. 19 is an elevational view of a slightly different form of tubular product, Fig. 20 is a partial sectional view illustrating the process in connection with a blank having a square of polygonal cross section, Figs. 21, 22 and 23 are cross sectional views of the apparatus shown in Fig. 20 and taken respectively on lines 21, 22 and 23 of Fig. 20 and looking in the direction of the arrows, Fig. 24 is a side view on enlarged scale of a tubular product of this invention, Fig. 25 is a view of the article shown in Fig. 24 after said article has been heated sufficiently to permit the initial internal stresses to partially restore the material to the form of the original blank, Figs. 26 and 27 are cross sectional views on lines 26—26 and 27—27 of Figs. 24 and 25 respectively, Fig. 28 is a longitudinal sectional view of Fig. 25 showing the interior, Figs. 29 and 30 are longitudinal sectional views of molding apparatus showing the formation of a tubular plastic around an internal shell, Figs. 31 and 32 are vertical sectional views similar to Figs. 11, 12 and 13 but illustrating a modification in which the tubular product of this invention is provided with a surface inlay, Fig. 33 is a partial elevational view of a product of the process as illustrated in Figs. 31 and 32, Fig. 34 is a partial view in finished form of a portion of the tubular product shown in Fig. 33, Figs. 35 and 36 are vertical sectional views similar to Figs. 11, 12 and 13 but illustrating the formation of a modified type of tubular product, and Fig. 37 is an elevational view of a sectional die construction adapted to be used in the process of this invention.

In prior practice articles of rod, block or strip material have been formed by turning to shape from solid stock or with hollow articles by boring or by shaping in a die by internal fluid pressure or a die plunger. The turning or boring is wasteful and costly, the use of internal fluid pressure is troublesome, inaccurate and expensive and the die formation under prior practice has involved excessive mutilation of the plastic material making it difficult to predetermine the decorative effects and setting up irregular initial stresses in the material which may later cause distortion due to the well known tendency of such stressed thermoplastic to resume the form it originally had before shaping.

According to the present invention these objections are overcome and thermoplastic material in blocks or rods is formed into desired shape with substantially no wastage or crushing of the material and with a systematically accurate control of the forming action which may be precisely predetermined to give the desired dimensions and decorative effects.

In the specific embodiment of the invention shown in Figs. 1 to 10, the article to be molded is of solid elongated form (Figs. 5 and 9) adapted to serve for instance as the handle of an umbrella rod. Assuming a final article polygonal in section, the blank or rod of thermoplastic material will preferably be of corresponding shape in section as shown by the blank 41 (Fig. 4) having ends 42, 43 and parallel rectangular sides 44. This blank for the method of this invention may be and preferably is of a seasoned thermoplastic material formed of a cellulose ester such as nitrocellulose or acetylcellulose mixed with plasticizers giving the desired stiffness and rigidity for ordinary handling but plastic under heat and pressure.

These blanks are preferably cut to size from strip or rod stock which itself is of the general form and surface configuration desired in the final product. Such stock may be made by extruding or cutting block material or in any desired manner, and preferably forms these stock strips or rods without substantial internal stresses so that the material is not undesirably warped or distorted by heat.

Such a blank 41 is heated to sufficient plasticity to cause it to flow under pressure but its temperature is preferably maintained below the point where it becomes liquid. Its tendency is to retain its shape but to flow into and retain a different form under proper pressure. For instance the heated blank 41 is placed in the barrel or holder 45 having its bore 46 shaped to fit the sides 44 of the blank and provided with a plunger 47 snugly fitting the bore and adapted to press against the end 43 of the blank. Usually the holder 45 will be warmed to avoid chilling the blank.

The bore 46 of holder 45 leads to a recess 48 of a die 49 positioned at the end of the holder, the bore 46 and recess 48 merging smoothly together. The recess 48 is formed to the desired contour of the final product and in Fig. 1 has tapering sides 50 forming a polygonal section decreasing regularly in size to the upper end closed over by the cap block 51 provided with the air escape and relief opening 52. This die 49 is preferably also heated to maintain the plasticity of the material and as the blank 41 is slid endwise from the bore 46 into the die 49 the recess walls will gradually and progressively constrain and mold it into its final form.

The molding pressure is applied by the plunger 47. At the first movement of this plunger little resistance is encountered, the blank 41 simply slipping along the walls 46 but as the blank enters the recess 48 its end is engaged with increasing side pressure as the recess contracts (Fig. 2). This side pressure is transmitted throughout the plastic blank and the pressure of the plunger 43 increases so that the whole of the blank is under progressively increasing pressure except the leading end 42 where the surface of the blank is free.

A thermoplastic mass thus retained and put under pressure all around and at one end will tend to expand at the free end as long as the pressure is maintained and with the method of this invention this expansion of the free end goes on constantly as the die recess continues to exert back pressure and as the plunger 47 forces itself forward against this pressure.

As a consequence of this expansion the free end 42 moves ahead faster than the plunger 47 and the blank 41 is progressively tapered and elongated at the same time (Fig. 3). The leading end of the blank is continuously contracted from end to end of the recess 48 and each following increment of the blank is correspondingly contracted from the entrance opening to its innermost position in the final product designated A (Fig. 5). In this way each part of the blank receives substantially the same kind of die formation and the action on each part is very nearly uniform. The entering end first begins to contract and elongate and as this continues the next increment begins its contraction and elongation, and so on as all preceding portions continue this progress along the recess 48 each succeeding increment is subjected to the same action. The only difference is in the time and extent of the action. The total elongation is greatest in the leading increments and progressively less in the succeeding increments and most of the elongation is in the entering half of the blank so that the center point 53 of the blank 41 is considerably below the middle 54 in the final product.

The quantity of material in the blank 41 is preferably just sufficient to fill the recess 48 with perhaps a slight excess which in the final position of plunger 47 will extend into the air outlet 52 and form the projection 55. The regularity of the molding operation preserves the distribution of the material so that the point 53 of the blank (Fig. 4) is substantially the same in the molded product A (Fig. 5) with equal weights of material above and below. The evenness and mildness of the molding action uniformly distributes the distortion and places all portions of the final article A under initial stresses roughly varying with the degree of contraction and elongation of each part. These stresses when symmetrically arranged and not too excessive are negligible in effect but may be demonstrated by heating the article and permitting it to freely act under the residual forces. In article A for instance the leading end having been mainly elongated will be under higher tension with greater tendency to shorten and thicken, and these residual "restoring" stresses progressively decrease toward the lower end. These stresses may be due to a stretching and fixing of the fibers of the material but whatever the explanation it is an observed fact that when the article A is thoroughly heated to 100° C. for instance, which is above the molding temperature, it will tend to resume the shape of the original blank 41. Such partial restoration is illustrated in Fig. 6 where the member A' is shorter than article A and longer than blank 41. The restoration is substantially proportional and homogeneous, the center of gravity 56 being substantially corresponding to the point 53 of the blank 41 and article A and located between the positions of this point in said blank and said article. Near the entering end the restored member A' shows a slight ridge 57 around the periphery, this being no doubt the result of a tendency to slight concentration of molding forces and resultant residual stresses in this area as the material progresses along the walls 50 (Figs. 2 and 3).

To compare in detail the relative elongations and retardations of the successive parts of the rod the lines 60 equally spaced along one side 44 in Fig. 4 are repeated as they would re-appear in the article A (Fig. 5) and the member A' (Fig. 6). The relative spacing of these lines in the three figures, 4, 5 and 6 illustrates the progressively lessening elongation downward from the entering end 42. This gives a very even and uniformly varying elongation of the rod with a perfect symmetry of the rod around its axis maintained throughout the entire operation and in the final product. The result is a symmetrical distribution of the material and the residual stresses resulting from the molding operation so that all parts of the structure are in balanced equilibrium. This progressive controlled distortion permits decorative surface effects to be accurately arranged and predetermined, and these will be maintained in the final article. Regular figures and linings may be used. Pearl effects are made particularly brilliant by the process of this invention, the pearl luster being markedly increased in the final surfaces. This accentuation of the pearl effect is no doubt due to the regular extrusion or flowing of the thermoplastic against the die surfaces. I have found that the contact of the flow with these surfaces along the lines of flow acts to aline the scintillating reflective particles used to give the pearl effect, and the better the alinement the more brilliant the pearl. Irrespective of the original disposition of the pearl particles in the thermoplastic the process of this invention turns them into substantial parallelism or orientation at the surface films and greatly enhances the pearly appearance making it more attractive and distinctive. At the conclusion of the molding operation the die is chilled to cool the thermoplastic and set it in its molded form after which it is drawn off the article A, which is then ready for the final trimming and finishing operations.

While the rod shown in Figs. 4 and 5 is hexagonal in cross section other forms of polygons may be molded in the same manner, and in particular rods or blanks of square sections may be tapered, elongated or otherwise molded in accordance with this method. In Figs. 7 to 10 the method is shown applied to a cylindrical blank 61 having its leading end 62 rounded as shown, and its other end 63 adapted for contact with the plunger 67 in the holder 65, the blank being set in said holder in contact with the inner bore surfaces 66 as indicated in dot and dash lines in Fig. 7. Then when the plunger is forced upward the blank is progressively elongated and tapered into the frustum of a cone within the conical surface 68 of the die 69, the upper end of which is closed by the cap block 51' having the release opening 52'. The article B molded in circular form is shown in perspective in Fig. 9 and has a structure very similar to the structure of the article A of Fig. 5 except for the rounding of the periphery. This article B is similarly internally stressed in the direction of return to the original blank 61 and when heated will adapt itself to an intermediate shape as indicated by the member B' shown in Fig. 10.

The process of this invention readily adapts itself to the setting of inlays in the surface of the molded articles. For instance, by placing the hollow tapered tube 64 within the die recess 68 the subsequently molded material will flow within this tube so that it will be inset or inlaid substantially flush with the surface of the final article.

The method is also applicable to the formation of hollow structures, such, for instance, as tubes or tubular formations integral at one end as illustrated in the remaining Figs. 11 to 37. In this embodiment the article to be formed is a pen or pencil barrel C (Fig. 16) or cap D (Fig. 19) of generally tubular formation integrally closed over at one end. These articles are made from solid block or rod material as indicated for instance at R (Fig. 14) and the barrel or cap after die shaping is adapted for final turning, polishing, etc., to finished form. Preferably the composition of the rod is such as to provide material which will soften and flow under pressure at temperatures above normal, and the thermoplastic blank in the form of a rod is first heated to a degree at which it will flow under pressure. It is then placed in a confining chamber formed by the walls of the bore 70 of the die 71. These walls surround and retain the blank throughout substantially its entire peripheral surface and preferably the walls are heated or maintained hot so as not to chill the surface of the blank below the desired flowability. A portion, one end, of the blank R is engaged and placed under pressure by the plunger 72 while a molding resistance is exerted at another portion, namely, the opposite end, by the central mandrel 73 having a point 74 entering recess r in the blank and tending to expand or spread the thermoplastic.

As the blank R is compressed between the plunger 72 and mandrel 73, it expands and tightly presses against the walls of the bore 70 and develops a fluid pressure which is transmitted in all directions with substantially equal intensity. The blank is confined at both ends and around its entire periphery; only a relatively small portion of its surface is free at space S between the mandrel 73 and the bore 75 forming a continuation of the bore 70. The end of the fluid mass R will flow into this space as shown in Fig. 11a radially expanding around the mandrel 73 and into contact with the bore 75. Continued pressure is applied by plunger 72 to maintain the fluid pressure on the thermoplastic mass R which is rigidly confined between the inner, outer and end walls except for the annular surface of the flow between the mandrel and the bore. As the movement of the plunger 72 is continued the fluid material yields toward this surface of least resistance and expands into the space S in annular form as shown (Figs. 12 and 15) flowing up through the bores 75 and 76 until (Fig. 13) its free surface reaches and stops against the end wall 80.

During the flowing period the pressure on the fluid mass is greatest at the plunger 72, decreasing slightly between the plunger and mandrel, then dropping markedly in the space S and progressively decreasing from there to free surface in the bores 75, 76. The flowing action is systematic in subjecting each successive increment of the blank to the same progressive radial expansion and simultaneous longitudinal extension, the blank R' (Figs. 12 and 15) being longer than blank R (Figs. 11 and 14), and the completely molded article B (Figs. 13 and 16)

being longer than the intermediate blank R' (Fig. 15).

There is thus a predetermined distortion of the blank R to greater diameter and longer length while it is being formed into tubular shape, which distortion is progressively applied to each successive section of the blank as it reaches the mandrel point 74. The sizes and relative proportions of the mandrel and die and the resultant size of the space S may be very accurately predetermined to give precise dimensions in the final product. The volume of the material in blank R (Fig. 14) is substantially the same as that in the intermediate blank R' (Fig. 15) and the tubular product B (Fig. 16). To illustrate the regularity of the expansion of the blank the rod R (Fig. 14) is shown with evenly spaced transverse lines 38, which lines will be maintained substantially transverse in the intermediate and final stages, as indicated in Figs. 15 and 16. The elongation of the blank, however, as it expands in space S increases the spacing of these lines 78 as shown in the upper part of Fig. 15 and in all but the lowermost tip of Fig. 16. By this progressive controlled distortion, therefore, decorative surface effects may be accurately predetermined and maintained, and regular figures and linings may be used.

The new tubular article with its new decorative finish in regular predetermined formation is completed to desired length between the die and mandrel, and as the material reaches the upper end of the passage it is stopped by the end surface 80 of the die head 81. This stoppage prevents further flow and the fluid pressure throughout the entire mass tends to rise and equalize forcing the material tightly against the confining surfaces so as to accurately conform to the desired shape. Air escape grooves 82 are provided between the die and the die head permitting the material to thoroughly fill the die cavity without resistance of air pockets. Upon completion of the stroke of the plunger 72 and the application of the final pressure, the plunger is retracted and the molding operation is complete.

The die is then chilled to cool the thermoplastic and set it in its molded form after which the die is drawn off the tube B which in turn is stripped from the mandrel 73 and is ready for the final trimming and finishing operations.

The rod stock of thermoplastic material may be square, hexagonal or other polygonal form instead of round. For instance, as shown in Fig. 20 the blank Q is square in cross section and as is also the pressure plunger 92 engaging the blank at its lower end. The die 91 has its inner recesses 90 correspondingly squared to fit the blank and plunger 92, and this square walled bore is carried up to intersect the conical expanding bore 95, these two bores merging along the line of intersection so that the outer periphery changes progressively from square to circular formation as the material flows up around the inner mandrel 73. A transition from the square to the circular is shown in the sectional views (Figs. 21, 22 and 23). This method of formation is particularly advantageous in permitting the original rod stock to be cut into square or hexagonal form from block material avoiding wastage involved in cutting circular rods from block stock.

With the tubular product of this process each increment of the tube is simultaneously expanded and elongated in precisely similar manner and then slid along between the mandrel and die surfaces. The uniform treatment of each part gives the structure a homogeneous distortion with all portions substantially equally expanded and stretched so that the residual stresses are in equilibrium and evenly balanced all around. This is evident from the form which the article 98 (Fig. 24) takes when heated sufficiently to permit these forces to restore the article toward the shape of the original blank R.

As a consequence of the smoothing, ironing action of the die surfaces surface decorative effects are brilliantly brought out, particularly pearl effects due to scintillating particles of pearl essence. The blank R may for instance be of pearl mottled material, cut from rod stock that comes to the trade with the pearl component distributed irregularly therethrough, and, according to the specifications for pearl in the stock, it will have a greater or less surface exposure of pearl. Ordinarily, stock for high class fountain pen holders contains a relatively high content of pearl, and there will be an average pearl exposure in such stock of 50% of the surface. It is thus pearl which gives the lustre to the surface. By the process of this invention a rod blank having a relatively small external surface area is so treated as to expand it into a thin tubular holder element having many times the surface area of the rod blank, and I have found that in this process of expansion the pearl component of the stock will have materially accentuated itself and to a very noticeable extent will have displaced the ordinary stock so that in the finished article not only an improved mottled pearl effect is attained, but the brilliance and lustre of the finished holder is materially enhanced as compared with any brilliance and lustre that has heretofore been attained by the polishing of the stock in the absence of its expansion.

The die forming action of the process of this invention also tends to weld over and close the pores of the material giving a hard metallic finish both to the surface (articles A, B, C and D) and to the bore 77 (articles C, D and 98). Such smooth surfacing is very desirable in dispensing with or simplifying later finishing operations and in sealing the material against evaporation of residual solvents and plasticizers.

The even distribution of the residual stresses tends to preserve the article against distortion in service, and even under the intentional warping effects of heating in boiling water the tubular article returns symmetrically toward the original shape as illustrated in Figs. 24, 25, 27 and 28. As shown in Fig. 25 the even spacing of the lines 78 of Fig. 24 is preserved in the member 98' resulting from the heating operation. Only the spaces between the lines are evenly shortened throughout the tubular member 98' and the spaces between the lines 78 near the closed end shorten relatively slightly and in decreasing amounts toward the tip. At the same time the generally cylindrical shape of the article is preserved with an increase in the thickness of the walls as will be seen by comparison of Figs. 26 and 27, this thickening being substantially uniform throughout the hollow portion of the member 98'. The interior of the heat treated member (Fig. 28) therefore maintains its straight cylindrical form with its walls substantially evenly spaced around the central axis. Such absence of warping under the severe releasing action of the boiling water is a fairly accurate measure of the extremely smaller tendency of the article to warp or lose its shape in service at ordinary temperatures, any such tendency being substantially negligible in the product of this invention.

As shown in Figs. 29 and 30 the expanding action of this method may be utilized to produce a composite structure with an inner liner of metal. Such a metal lining shell 100 is fitted with a supporting core or mandrel 101, and this in effect forms a newly sized mandrel of larger diameter around which the plastic material is expanded and slides as around the mandrel 73. Then upon the cooling of the dies the stripping of the plastic tube will carry with it and tightly hold the internal liner as the plastic shrinks and grips the tube 100 as a permanent interior lining.

As indicated in Figs. 31 to 33 inclusive, the process of this invention is also adaptable in combining the tubular article with other material in the form of surface inlay, such for instance as decorative metal scroll work 56 in open-work tubular form. As indicated in Fig. 31 such an inlay of generally cylindrical form may be inserted as shown in the lower portion 111 of a die having a separate upper portion 112 between the lower portion and the head 113 carrying the mandrel 73. Then as the flowing plastic material passes upward around the mandrel, it will fill in the spaces left between the outer die and inlay and the inner mandrel and complete the tubular article with the surface of the inlay flush with the surface of the tube $B_1$. The separate upper section 112 permits the tube $B_1$ to extend beyond the inlay to form a collar or flange portion $b$ in the molded article which may be finished off finally in any desired taper or shape as indicated at $b_1$ in Fig. 34, the bore 114 of die section 112 being slightly smaller than the bore 116 of die section 111 so that the tubular inlay 106 is held axially in position against the slight overhanging ledge between these two die sections.

Various shapes of tubing may be formed according to the process of this invention by simply correspondingly shaping the dies. For instance as indicated in Fig. 35 the final blank $B_2$ may have a convex periphery, the die sections 117 and 118 being separable along the transverse plane 119 at the maximum diameter of the blank. With the die sections 120 and 121 separable along an axial plane 122 the blank $B_3$ (Fig. 36) may have its periphery convex or concave or any other desired regular shape and by increasing the number of die sections along vertical planes various irregular peripheral contours may be produced. As shown in Fig. 37 the outer molding die may be divided into any desired number of sections, such for instance as an upper tubular section 125 above the axially separable sections 126, 127. The die sections may also be separated along diagonal lines as indicated at 128 (Fig. 37) or along combined diagonal and axial lines as indicated at 129 and 130. The radially separable die sections may be in any desired number of parts as indicated at 131, and the interior recesses formed by any of these die sections may be of any circular, oval or polygonal shape permitting the plastic material to flow longitudinally and to fill the space under pressure as the end of the die is reached and the pressure is correspondingly increased.

This application is a continuation in part of application No. 677,995, filed June 28, 1933.

I claim:

1. The herein described process for the production of high lustre mottled pearl holder elements for pens, pencils, and the like, which consists in providing a solid blank of seasoned material of stiffness and rigidity suitable for ordinary handling and having materially less external surface area than that of the holder element to be formed therefrom, subjecting said blank to heat and pressure so as to expand it in a mold with a large increase in its surface area to form a holder element, heating the blank and mold prior to the forming operation, cooling the mold with the molded element therein after the forming operation, and stripping the molded holder element from the mold.

2. The process of forming articles of solid material which is permanently thermoplastic comprising supplying a solid blank of said material of desired stiffness and rigidity for ordinary handling, supporting said blank substantially around its entire periphery and end so as to leave one end free, applying heat to said blank to render it plastic, exerting pressure on the end opposite said free end so as to cause a relative sliding of said heat-softened blank longitudinally while supporting it around its entire periphery, providing a die having a recess of greater length and less cross sectional area than said blank and tending to restrict the free end of said blank and continuing said pressure on said heated blank while lengthening it and forcing it into the form determined by the walls of said die recess, stopping the movement of said blank while forcing it against the confining surfaces of said die so as to accurately conform to said surfaces and be finally shaped thereby, and permitting said blank to harden by cooling in said final shape to said original stiffness and rigidity suitable for ordinary handling.

3. The process of forming articles of solid material which is permanently thermoplastic comprising supplying a solid blank of said material of desired stiffness and rigidity for ordinary handling, supporting said blank substantially around its entire periphery and end so as to leave one end free, applying heat to said blank to render it plastic, exerting pressure on the end opposite said free end so as to cause a relative sliding of said heat-softened blank longitudinally while supporting it around its periphery, providing a die having a recess of greater length and less cross sectional area than said blank and tending to restrict the free end of said blank and continuing said pressure on said heated blank while lengthening it and forcing it into the form determined by the walls of said die recess and causing said free end to move faster than the opposite end so that the blank becomes longitudinally elongated, stopping the movement of said blank while forcing it against the confining surfaces of said die so as to accurately conform to said surfaces and be finally shaped thereby, and permitting said blank to harden by cooling in said final shape to said original stiffness and rigidity suitable for ordinary handling.

4. The process of formng an article of thermoplastic material comprising providing a blank of said material of stiffness and rigidity suitable for ordinary handling, assembling a decorative means of generally tubular form in predetermined relation to said blank, supporting said blank substantially around its entire periphery and end so as to leave one end free, applying heat to said blank to render it plastic, exerting pressure on the end opposite said free end so as to cause a relative sliding of said heat-softened blank longitudinally while supporting it around its periphery and permitting it to gradually and progressively expand in annular form at one end while confining its opposite end and periphery, and molding said expanding thermoplastic material into intimate embracing contact with said decorative means so that said decorative means is embedded in said material.

5. A holder element for pens, pencils and the like formed in accordance with the process set forth in claim 1 and of regular elongated shape around a longitudinal axis and having residual stresses substantially evenly distributed around said axis and tending to shorten the length of the article along said axis so that when said article is sufficiently heated below its melting temperature its length will automatically be reduced with a corresponding increase in width while preserving the characteristic regular shape of the article before heating.

6. A finished article of thermoplastic material formed by the process of claim 2 and of regular elongated tubular form around a longitudinal axis and having its residual stresses substantially evenly distributed around said axis and tending to shorten the length of the tube so that when said article is sufficiently heated below its melting temperature its length will automatically be reduced with corresponding increase in thickness while preserving its tubular form.

7. A finished article of thermoplastic material formed by the process of claim 3 and of regular elongated tubular form around a longitudinal axis and having its residual stresses substantially evenly distributed around said axis and tending to shorten the length of the tube so that when said article is sufficiently heated below its melting temperature its length will automatically be reduced with corresponding increase in thickness while preserving its tubular form.

8. A decorated article of thermoplastic material formed in accordance with the process set forth in claim 4 and of regular elongated shape around a longitudinal axis and having residual stresses substantially evenly distributed around said axis and tending to shorten the length of the article along said axis so that when said article is sufficiently heated below its melting temperature its length will automatically be reduced with a corresponding increase in width while preserving the characteristic regular shape of the article before heating.

WILBUR F. ST. CLAIR.